United States Patent

Machida et al.

[11] Patent Number: 5,514,446
[45] Date of Patent: May 7, 1996

[54] CERAMIC HONEYCOMB STRUCTURAL BODY

[75] Inventors: Minoru Machida, Nagoya; Koichi Ikeshima, Okazaki, both of Japan

[73] Assignee: NGK Insulators, Ltd., Japan

[21] Appl. No.: 401,436

[22] Filed: Mar. 9, 1995

[30] Foreign Application Priority Data

Mar. 11, 1994 [JP] Japan .................................. 6-041140

[51] Int. Cl.$^6$ ................................................ B32B 3/12
[52] U.S. Cl. ........................ 428/116; 428/117; 428/118
[58] Field of Search ..................... 428/116, 117, 428/188

[56] References Cited

U.S. PATENT DOCUMENTS 4,304,585  12/1981  Oda et al. ........................ 428/116 X
4,448,833  5/1984  Yamaguchi et al. ................... 428/116
4,451,517  5/1984  Inoguchi et al. .................... 428/188 X
5,219,667  6/1993  Hampton ........................... 428/593

FOREIGN PATENT DOCUMENTS

0554104  1/1993  European Pat. Off. .
61-97037  5/1986  Japan .
63-12658  3/1988  Japan .

Primary Examiner—Henry F. Epstein
Attorney, Agent, or Firm—Parkhurst Wendel & Rossi

[57] ABSTRACT

In order to obtain a honeycomb structural body having excellent mechanical strength, which can eliminate a waste use of a catalyst, incomplete cells at an outermost peripheral portion of the honeycomb structural body are sealed selectively by ceramic materials. An incomplete cell does not have a square cross section if the complete cell has a square cross section, and is preferably defined by the cell having an area not more than 90% as that of the complete cell.

7 Claims, 5 Drawing Sheets

FIG_3

FIG_4

FIG_6A
*PRIOR ART*

FIG_6B
*PRIOR ART*

FIG_6C
*PRIOR ART*

FIG. 7
*PRIOR ART*

CERAMIC HONEYCOMB STRUCTURAL BODY

BACKGROUND OF THE INVENTION

1. Field of the Invention

The present invention relates to a ceramic honeycomb structural body used for a catalyst carrier for purifying an exhaust gas of an internal combustion engine, a filter for trapping soot, or a catalyst carrier for purifying and/or deodorizing a firing gas of fuels such as petroleum, various kinds of gases and the like.

2. Description of the Related Art

Usually, as for a catalyst carrier for purifying an exhaust gas of an internal combustion engine, a filter for trapping soot, or a catalyst carrier for purifying and/or deodorizing a firing gas of fuels such as petroleum, various kinds of gases and the like, use is made of a ceramic honeycomb structural body made of cordierite, mullite and the like.

Figure 5A:
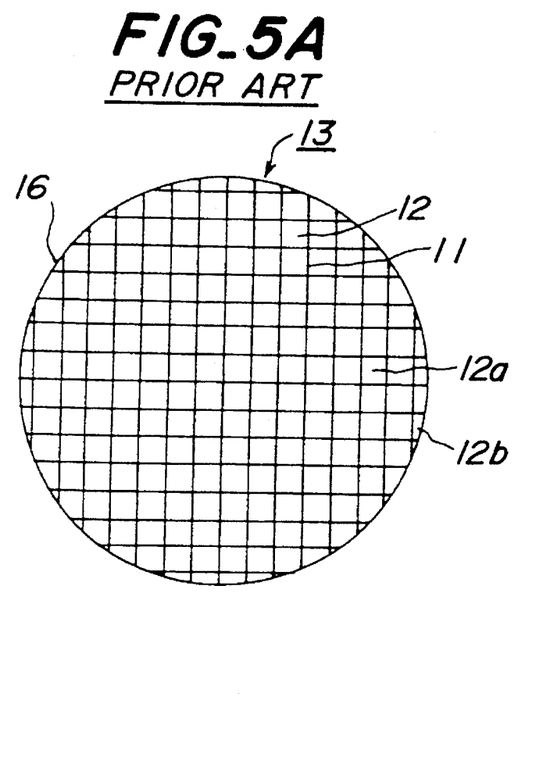
FIGS. 5A and 5B are schematic views respectively illustrating an embodiment of a known ceramic honeycomb structural body.

FIG. 5 is a cross sectional view showing one embodiment of a known ceramic honeycomb structural body 13. As shown in FIG. 5A, the ceramic honeycomb structural body 13 comprises an outer wall 16 and a plurality of cells 12 formed by through holes extending in a gas flow direction, which are defined by partition walls 11 arranged in the outer wall 16. In the known ceramic honeycomb structural body 13, all the cells 12 including a complete cell 12a and an incomplete cell 12b extend through from one end of the ceramic honeycomb structural body 13 to the other end. In this case, the complete cell 12a means a cell having a complete square cross section, and it is arranged in a center portion of the ceramic honeycomb structural body 13. Moreover, the incomplete cell 12b means a cell not having a complete square cross section, and it is arranged in an outermost peripheral portion of the ceramic honeycomb structural body 13.

Figure 5B:
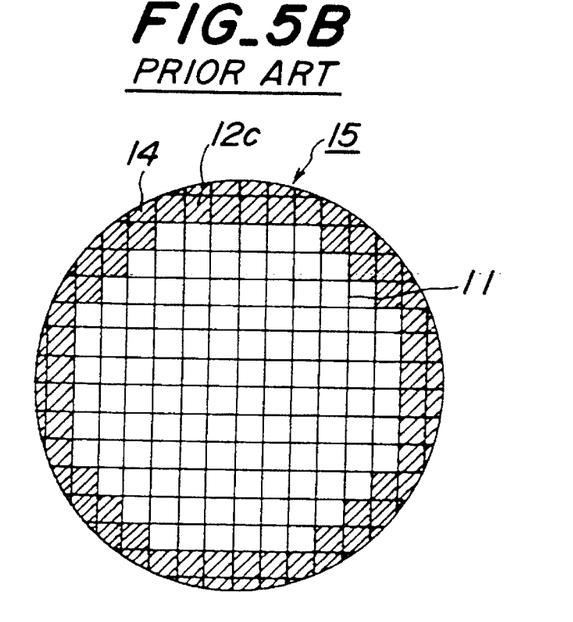

In order to eliminate a crack generation at the outermost peripheral portion of the known ceramic honeycomb structural body 13 shown in FIG. 5A, Japanese Patent Publication No. 63-12658 (JP-B-63-12658) discloses a ceramic honeycomb structural body 15, in which all the cells 12c arranged near the outermost peripheral portion are sealed by ceramic materials 14 having a heat resistivity as shown in FIG. 5B. In this case, the ceramic materials 14 are arranged into the cells 12 along a 10 mm distance from the end of the ceramic honeycomb structural body 15.

Figure 6A:
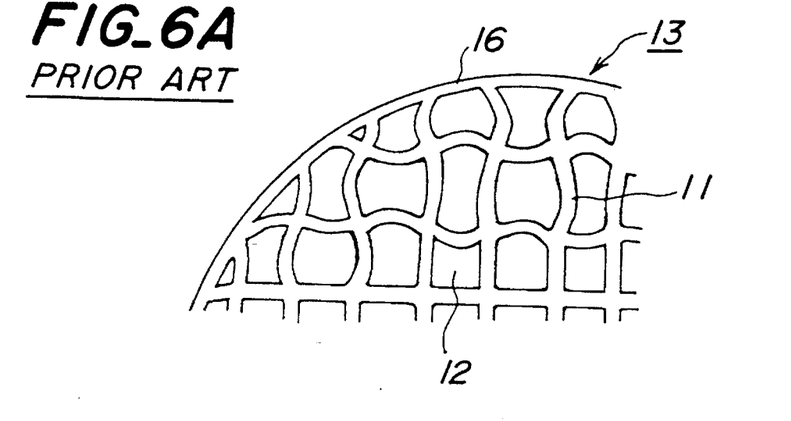
FIGS. 6A, 6B and 6C are schematic views respectively depicting a defect of the known ceramic honeycomb structural body.
Figure 6B:
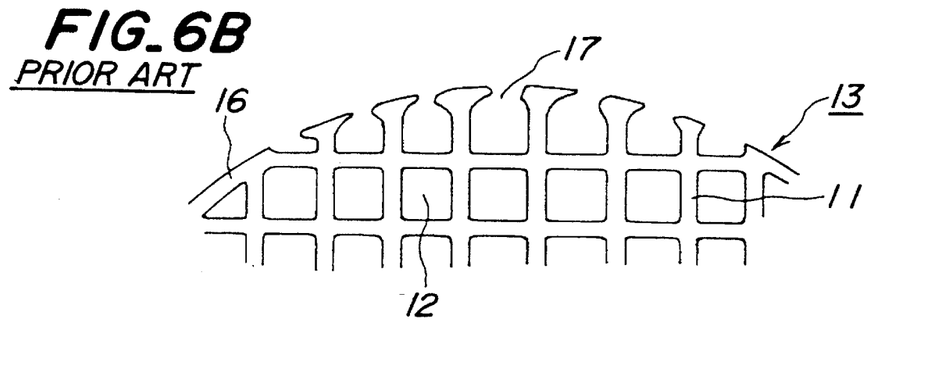

In the known ceramic honeycomb structural body 13 having the constitution shown in FIG. 5A, if the outer wall 16 and the partition walls 11 of the ceramic honeycomb structural body 13 are thin, they are liable to be transformed as shown in FIG. 6A, or the outer wall 16 is not formed continuously and a gap 17 is generated in the outer wall 16 as shown in FIG. 6B. In these cases, an endurable applied pressure strength of the ceramic honeycomb structural body 13 is weakened. Therefore, a crack is generated in the ceramic honeycomb structural body 13, and, in an extreme case, the ceramic honeycomb structural body 13 is broken when assembled as a catalyst converter. Moreover, if being assembled as a catalyst converter, an exhaust gas does not pass through the cell 12, but passes through a metal wire portion which supports the ceramic honeycomb structural body 13 via a breakage portion due to the transformation of the partition walls 11 or through the gap 17. Therefore, it is not possible to achieve a sufficient purifying operation.

Figure 6C:
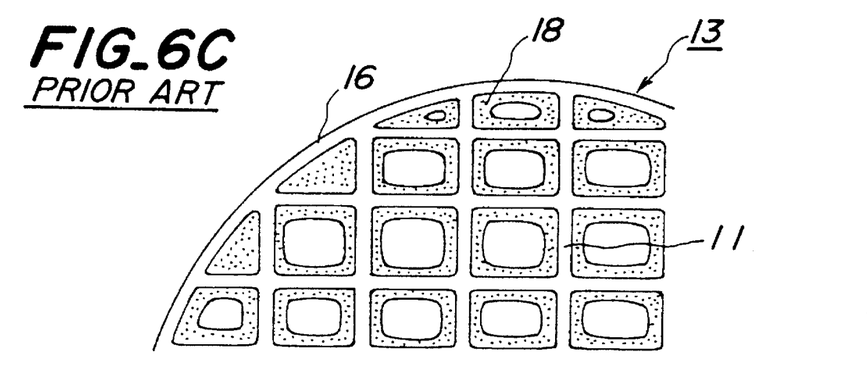
Figure 7:
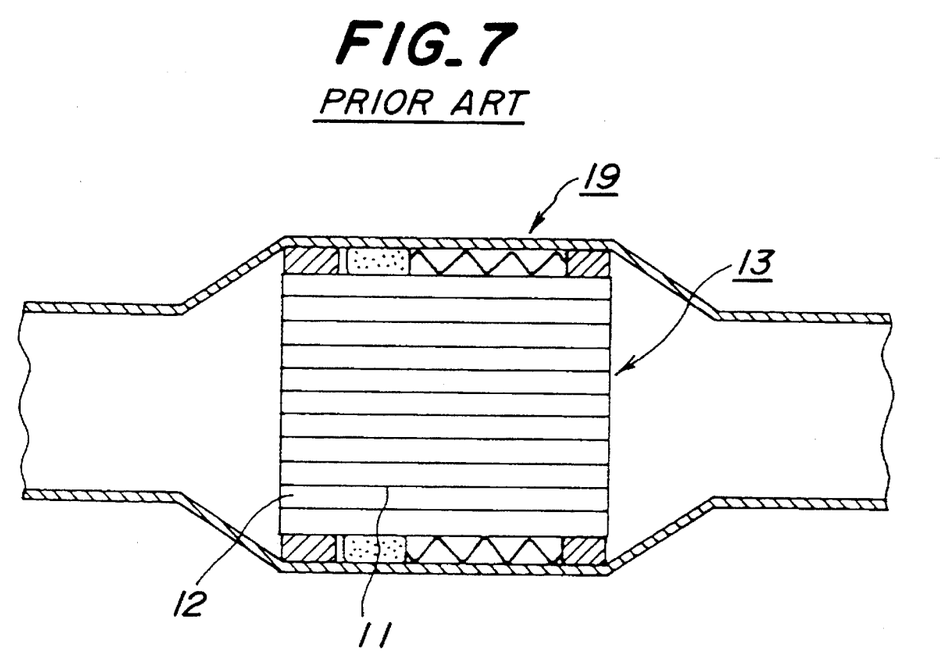
FIG. 7 is a schematic view showing one embodiment of a catalyst converter using the ceramic honeycomb structural body.

Moreover, in the incomplete cell 12b of the known ceramic honeycomb structural body 13, a catalyst 18 to be carried is thicker in excess as shown in FIG. 6C, and thus the catalyst 18 is wasted. Therefore, if the ceramic honeycomb structural body 13 is assembled in a catalyst converter 19 by supporting only its side surface as shown in FIG. 7, it is not possible to use the catalyst effectively, since an exhaust gas does not easy to flow due to a stuffing or a half-stuffing of the incomplete cell 12b.

Further, in the known ceramic honeycomb structural body 15 having the constitution shown in FIG. 5B, a plurality of the cells 12 are sealed by the ceramic materials 14 at the outer peripheral portion. In this case, if the sealing is performed at both ends of the ceramic honeycomb structural body 15, the catalyst to be carried is not wasted. However, since an exhaust gas does not flow in these sealed cells 12, a volume of the ceramic honeycomb structural body 15 is increased correspondingly. Moreover, if the sealing is performed not at the both ends but at a center of the ceramic honeycomb structural body 15, the catalyst is wasted, since the catalyst is adhered in the cells 12 whose center is sealed. Therefore, these known ceramic honeycomb structural bodies are not convenient for a real use.

SUMMARY OF THE INVENTION

It is an object of the invention to eliminate the drawbacks mentioned above and to provide a ceramic honeycomb structural body having a high mechanical strength in which a catalyst is not wasted.

According to the invention, a ceramic honeycomb structural body comprises complete cells at a center portion and incomplete cells at a peripheral portion, in which incomplete cells arranged at an outermost peripheral portion are sealed selectively by ceramic materials.

In the present invention mentioned above, the complete cell means a cell having a complete square cross section and the incomplete cell means a cell not having a complete square cross section. It is preferred to define the incomplete cell as a cell having an area as not more than 90% as that of the complete cell.

In the constitution mentioned above, since the incomplete cells at the outermost peripheral portion are selectively sealed, it is possible to obtain a stable high mechanical strength, while eliminating a catalyst flow in the incomplete cells. Therefore, the catalyst is not wasted and the complete cells can be used for carrying the catalyst as much as possible.

In this case, if the incomplete cell is defined by the cell having an area as not more than 90% as that of the complete cell, it is further possible to eliminate the waste use of the catalyst and the best performance can be obtained. Moreover, if the incomplete cells are sealed by the same ceramic materials that of the ceramic honeycomb structural body, the sealing of the incomplete cell can be performed more perfectly. If the ceramic honeycomb structural body is made of cordierite having a low thermal expansion performance, a durability of the ceramic honeycomb structural body in real use can be improved. If the incomplete cells are sealed by a cement having a heat resistivity or a catalyst including an active alumina as a main ingredient, the sealing operation can be performed easily. Further, in the present invention, a method of producing the ceramic honeycomb structural body is not limited. However, if the sealing of the incomplete cells are formed integrally with the ceramic honeycomb structural body or if the sealing of the incomplete cells are formed after sintering the ceramic honeycomb structural body, it is possible to form the sealing of the incomplete cells easily.

DESCRIPTION OF THE PREFERRED EMBODIMENTS

Figure 1:
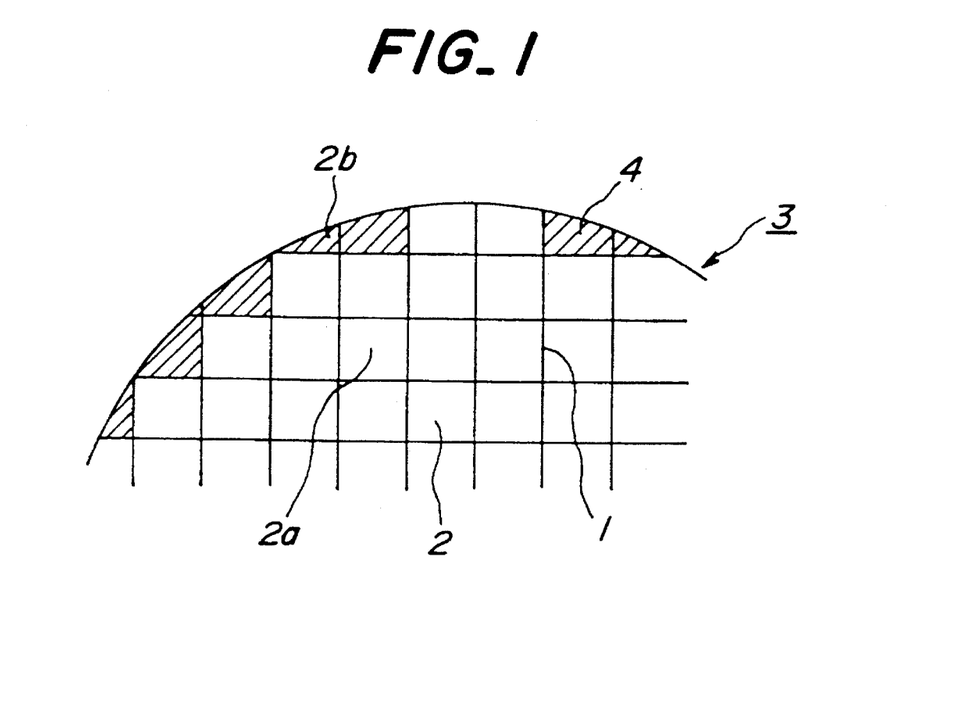
FIG. 1 is a schematic view showing a partly enlarged end portion of one embodiment of a ceramic honeycomb structural body according to the invention.

FIG. 1 is a schematic view showing a partly enlarged end portion of one embodiment of a ceramic honeycomb structural body according to the invention. In the embodiment shown in FIG. 1, a ceramic honeycomb structural body 3 comprises a plurality of cells 2 defined by partition walls 1. The cells 2 also form through holes extending along a flow direction (perpendicular to a plane of FIG. 1). The ceramic honeycomb structural body 3 is preferably made of cordierite. In this embodiment, an incomplete cell 2b not having a complete square cross section is sealed by ceramic materials 4, while a complete cell 2a having a complete square cross section is not sealed and maintained as it is. In this case, it is preferred to seal only the incomplete cell 2b having an area not more than 90% as that of the complete cell 2a. Moreover, as for the ceramic materials 4, it is preferred to use the same materials as that of the ceramic honeycomb structural body 3.

Figure 2:
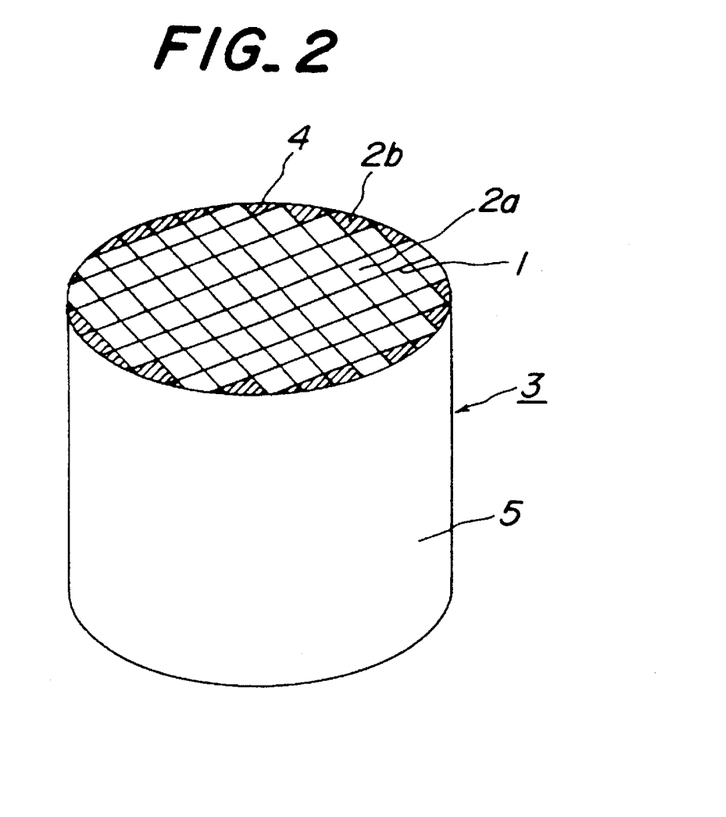
FIG. 2 is a perspective view illustrating one embodiment of the ceramic honeycomb structural body according to the invention.
Figure 3:
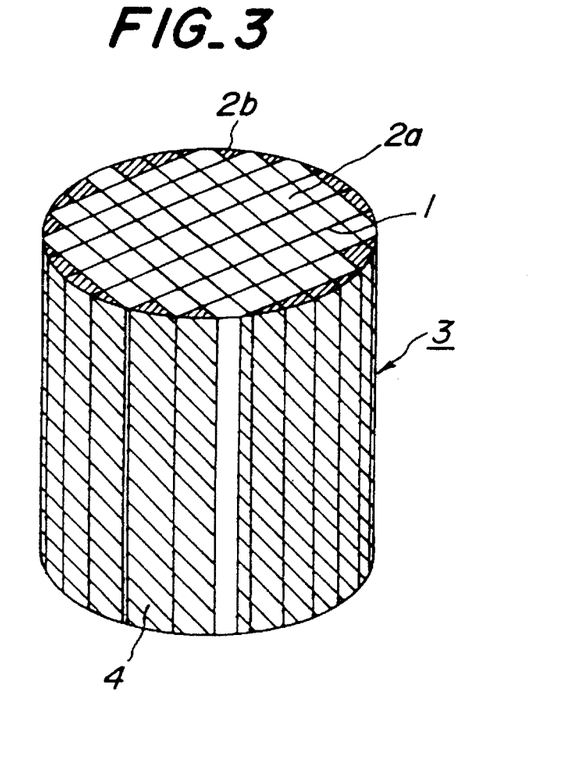
FIG. 3 is a perspective view depicting another embodiment of the ceramic honeycomb structural body according to the invention.

FIGS. 2 and 3 are perspective views respectively showing one embodiment of the ceramic honeycomb structural body 3 according to the invention. In the embodiment shown in FIG. 2, an outer wall 5 is provided to the ceramic honeycomb structural body 3 in which only the incomplete cell 2b is sealed by the ceramic materials 4, as in the embodiment shown in FIG. 1. In the embodiment shown in FIG. 3, the ceramic honeycomb structural body 3 having the same construction shown in FIG. 1 is illustrated.

As for a method of producing the ceramic honeycomb structural body according to the invention, it is not limited and all known methods can be used. However, it is preferred to use a method comprising the steps of extruding integrally a batch by using a die to obtain a ceramic honeycomb formed body in which an incomplete cell is sealed and sintering the ceramic honeycomb formed body, or to use a method comprising the steps of extruding a batch to obtain a ceramic honeycomb formed body, sintering the ceramic honeycomb formed body to obtain a ceramic honeycomb structural body and sealing an incomplete cell of the ceramic honeycomb structural body by ceramic materials. In these methods, a sealing operation of the incomplete cell can be effectively and easily performed.

Figure 4:
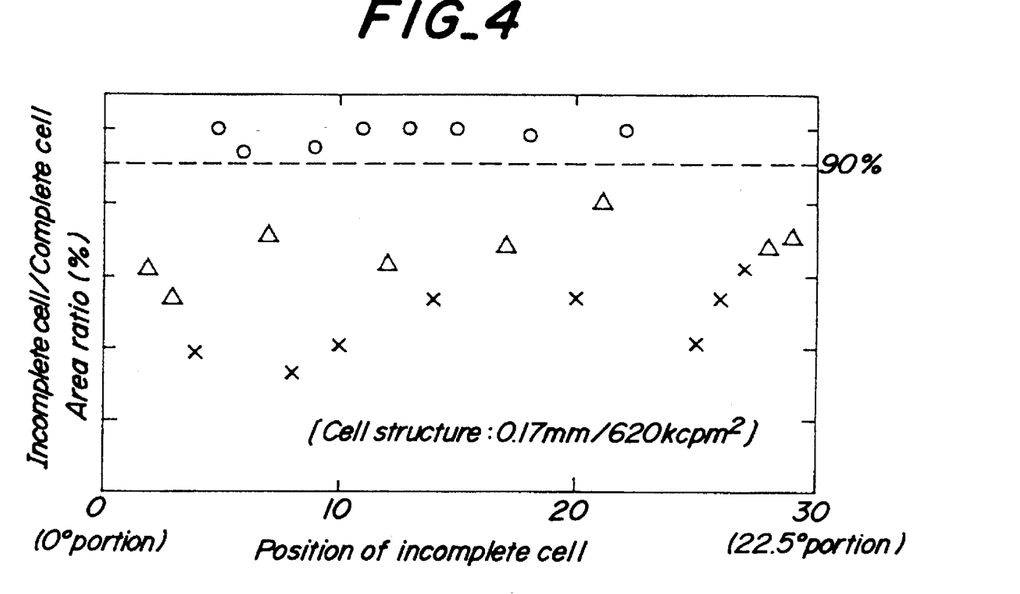
FIG. 4 is a graph showing a stuffing condition of the ceramic honeycomb structural body when carrying a catalyst.

FIG. 4 is a graph showing a stuffing condition of the ceramic honeycomb structural body when carrying a catalyst. In FIG. 4 showing a relation between a ratio of incomplete cell/complete cell and a position of the incomplete cell, a cell having an area not more than 90% as that of the complete cell is not stuffed, and thus it is understood that the incomplete cell to be sealed should be defined as the cell having an area not more than 90% as that of the complete cell. It should be noted that, in FIG. 4, a symbol ○ means a cell not stuffed, a symbol Δ means a cell partly stuffed and a symbol x means a cell stuffed. Hereinafter, actual embodiments will be explained.

EMBODIMENT

As shown in the Table 1 described below, ceramic honeycomb structural bodies of the specimen Nos. 1–5 according to the invention and the specimen Nos. 1–7 according to the comparative example were prepared. With respect to the thus prepared ceramic honeycomb structural bodies, a mechanical strength including an applied pressure strength, an enduring temperature difference representing a thermal shock resistivity and a pressure loss, and a catalyst carrying performance including a cell stuffing rate, a catalyst carrying weight and an effective area rate, were measured for a comparison. Dimensions of the ceramic honeycomb structural body were 101.6 mm in diameter and 101.6 mm in length, and a cell structure represented by a rib thickness/a cell density was also shown in the Table 1. Hereinafter, the embodiment mentioned above will be explained in detail.

PREPARATION OF THE SPECIMENS ACCORDING TO THE INVENTION

By using a die having a slit portion for forming an outer wall corresponding to a portion at which a diameter of a ceramic honeycomb structural body after sintering is 101.6 mm, and a cut out portion for forming integrally a sealing portion of an incomplete cell having an area not more than 90% as that of a complete cell, a cordierite ceramic batch was extruded into a ceramic honeycomb formed body. Then, the thus obtained ceramic honeycomb formed body was sintered to obtain ceramic honeycomb structural bodies having a shape shown in FIG. 2 according to the specimen Nos. 1, 3, 4 and 5 of the present invention.

By further using a mask having an opening portion corresponding to a portion at which a diameter of a ceramic honeycomb structural body after sintering is 110.0 mm, and a depression portion for storing a batch for the outer wall generation at an output side of the die mentioned above, a cordierite ceramic batch was extruded to obtain a ceramic honeycomb formed body. Then, the thus obtained ceramic honeycomb formed body was sintered and ground to obtain a ceramic honeycomb structural body having a diameter of 101.6 mm. After that, an incomplete cells were sealed by a cement having a heat resistivity and dried to obtain a ceramic honeycomb structural body shown in FIG. 3 according to the specimen No. 2. In the same manner, an incomplete cell was sealed by an active alumina paste and dried to obtain a ceramic honeycomb structural body shown in FIG. 3 according to the specimen No. 6.

PREPARATION OF THE COMPARATIVE EXAMPLE

By using a die having a slit portion for forming an outer wall corresponding to a portion at which a diameter of a ceramic honeycomb structural body after sintering is 101.6 mm, a cordierite ceramic batch was extruded into a ceramic honeycomb formed body. Then, the thus obtained ceramic honeycomb formed body was sintered to obtain a ceramic honeycomb structural body having a shape shown in FIG. 5A. In the ceramic honeycomb structural bodies thus obtained, 80% of the number of the ceramic honeycomb structural bodies had a transformation portion as shown in FIG. 6A. This transformation portion was generated at four outer peripheral portions arranged at 45° with respect to the partition walls, in which a depth along a radial direction was 3–4 cells and a total width of four portions was along about a half of a circumferential length. This ceramic honeycomb structural body was the comparative example 1. After that, the remaining 20% of the ceramic honeycomb structural bodies had only one small transformation portion in which a depth was 2 cells and a width was 4 cells. This ceramic honeycomb structural body was the comparative example 3.

By further using a mask having an opening portion and a depression portion for storing a batch for the outer wall generation at an output side of the die mentioned above, a cordierite ceramic batch was extruded to obtain a ceramic honeycomb formed body. Then, the thus obtained ceramic honeycomb formed body was sintered to obtain ceramic honeycomb structural bodies shown in FIG. 5A according to the comparative examples 4 and 5 and also ceramic honeycomb structural bodies shown in FIG. 6A according to the comparative example 6. The thus obtained ceramic honeycomb structural bodies according to the comparative examples 4 and 5 had no defects by an appearance inspection, but all the ceramic honeycomb structural bodies according to the comparative example 6 had a transformation portion as is the same as the comparative example 1. This transformation portion was generated at two outer peripheral portions arranged at 45° with respect to the partition walls, in which a depth was two cells and a total width was along about one-fourth of a circumferential length.

Moreover, in the comparative example 2, since an amount of ceramic batches neighboring the outermost peripheral portion was small in an extruding operation, the ceramic honeycomb structural body according to the comparative example 2 generated a cut out portion as shown in FIG. 6B. This cut out portion was generated at four outer peripheral portions in which a total width was a half of a circumferential length. The number of the ceramic honeycomb structural bodies according to the comparative example 2, in which the cut out portion is generated, was only 7%, and the remaining 93% of the ceramic honeycomb structural bodies had the transformation portion as is the same as the comparative example 1.

Further, ceramic honeycomb structural bodies according to the comparative example 7 were produced by masking the cells other than the outermost peripheral 2 cells in both ends of the ceramic honeycomb structural bodies according to the comparative example 3, sealing the outermost peripheral 2 cells which were not masked by a paste obtained by mixing raw materials for cordierite generation with water and binders, and sintering it. A depth of the sealing portion of the paste was about 15–30 mm.

COMPARATIVE ESTIMATION

With respect to the thus prepared ceramic honeycomb structural bodies, a mechanical strength including an applied pressure strength, an enduring temperature difference representing a thermal shock resistance and a pressure loss, and a catalyst carrying performance including a cell stuffing rate, a catalyst carrying weight and an effective area rate, were measured for a comparison. The results are shown in the Table 1.

(1) catalyst carrying performance:

At first, the cell stuffing areas of the specimens before carrying the catalyst were measured with respect to ten ceramic honeycomb structural bodies, respectively. The cell stuffing area was measured in such a manner that parallel light was introduced from one end of the ceramic honeycomb structural body and transmitted lights were picked up by a frost glass at the other end, thereby black portions were detected as a stuffing portion. As a result, all the ceramic honeycomb structural bodies had no stuffing portions.

Then, an upper side surface of respective ceramic honeycomb structural bodies after measuring the cell stuffing rates was sealed by a silicon rubber sponge, and a slurry obtained by mixing active alumina-ceria powders with aluminum nitride solution was intruded into inner portions of the ceramic honeycomb structural body. After that, the residual slurry was eliminated, and then the ceramic honeycomb structural body was dried up by repeating a drying operation under a condition of 150° C., 2 hours at three times for those having a partition wall thickness of 0.11 mm or at two times for those having a partition wall thickness of 0.17 mm. Then, the dried up ceramic honeycomb structural body was sintered under a condition of 600° C., 1 hour. Since a catalyst carrying weight was varied corresponding to a cell structure, the catalyst carrying weight was adjusted to be a predetermined level.

With respect to the honeycomb structural bodies after carrying the catalyst, the stuffing areas were measured again as the same manner mentioned above, and then a cell stuffing rates were obtained by a ratio of the cell stuffing area before carrying the catalyst and that after carrying the catalyst. The catalyst carrying was obtained from a dried weight difference between before and after carrying the catalyst. Moreover, an effective area rate was obtained by a ratio of a cell area before carrying the catalyst and a unstuffed cell area after carrying the catalyst, and it was indicated by a percentage in the case that the cell area of the present invention 1, 3, 4 or 5 was assumed as 100. The catalyst carrying rate and the effective area rate were shown by an average of respective specimens.

(2) Mechanical strength:

For measuring various mechanical strengths, three specimens were used respectively. At first, a measuring of an endurable pressure strength was performed by applying aluminum plates having a thickness of 20 mm to both ends of the ceramic honeycomb structural body through urethane sheets having a thickness of 0.5 mm and the same diameter as that of the ceramic honeycomb structural body, applying a urethane tube having a thickness of 0.5 mm to all side surface of the ceramic honeycomb structural body so as to seal the side surface, immersing it in a water of a pressure vessel and increasing a pressure step by step. After that, the endurable pressure strength was assumed as a pressure level before that when detecting a sound of breakage.

Measuring a thermal shock resistance was performed by setting the ceramic honeycomb structural body in an electric furnace maintaining it at 700° C. (room temperature +650° C.) for 20 minutes, removing it from the electric furnace and tapping an outer surface with a stick, while observing its appearance until it was cooled. In this case, if a crack was not detected and the tapping sound is a metallic sound, the same measuring was performed again at a temperature which was increased by 25° C. from the previous measuring temperature. After that, the thermal shock resistance was indicated by an endurable temperature difference which was a precious temperature before a temperature at which the crack was detected or the tapping sound was not a metallic sound.

Measuring a pressure loss was performed by setting the ceramic honeycomb structural body around which a ceramic mat was arranged in a vessel, and flowing air into inner portions thereof at a rate of 4 m³/minute. After that, the pressure loss was detected from a pressure difference between those at one end and the other end of the ceramic honeycomb structural body.

structural body having other cross sections such as an ellipse and the like. Moreover, in the embodiments mentioned above, the cell structure of the honeycomb structural body is square, but it is possible to use a honeycomb structural body having other cell structures. Furthermore, as for the materials, use is made of cordierite, but it is a matter of course that the other materials can be used.

As mentioned above, according to the invention, since only the incomplete cells are sealed selectively, it is possible to obtain stable mechanical strength and to eliminate waste of the catalyst. Moreover, since the complete cells can be used for the catalyst carrier as much as possible, the catalyst can be used fully.

TABLE 1

| Specimen No. | Shape | Cell structure rib thickness (mm)/ cell density piece/m² | Catalyst carrying performance | | | Mechanical strength | | Pressure loss (mm H₂O) |
|---|---|---|---|---|---|---|---|---|
| | | | Cell stuffing rate (%) | Catalyst carrying weight (%) | Effective area rate (%) | Endurable pressure strength (MPa) | Endurable temperature difference (thermal shock resistivity) (°C.) | |
| Present invention 1 | FIG. 2 | 0.11/620K | 0 | 188 (95%) | 100 | 2.7–3.3 | 900 | 61–62 |
| Present invention 2 | FIG. 3 | 0.11/620K | 0 | 189 (95%) | 99 | 2.9–3.3 | 900 | 61–63 |
| Present invention 6 | FIG. 3 | 0.11/620K | 0 | 189 (95%) | 99 | 2.7–3.2 | 800 | 62–64 |
| Comparative example 1 | FIG. 6(A) | 0.11/620K | 4.8 | 210 (106%) | 97 | 0.4–0.5 | 900 | 66–67 |
| Comparative example 2 | FIG. 6(B) | 0.11/620k | 2.5 | 206 (104%) | 99 | 0.6–0.6 | 900 | 62–62 |
| Comparative example 3 | FIG. 5(A) | 0.11/620k | 2.6 | 198 (100%) | 99 | 2.4–2.9 | 875 | 63–63 |
| Comparative example 7 | FIG. 5(B) | 0.11/620k | 0 | 182 (92%) | 94 | 2.4–2.8 | 775 | 68–70 |
| Present invention 3 | FIG. 2 | 0.11/930k | 0 | 190 (94%) | 100 | 5.0–5.3 | 900 | 87–90 |
| Comparative example 4 | FIG. 5(A) | 0.11/930k | 3.0 | 202 (100%) | 99 | 5.1–5.3 | 900 | 89–92 |
| Present invention 4 | FIG. 2 | 0.17/620k | 0 | 188 (95%) | 100 | 6.7–6.9 | 875 | 70–71 |
| Comparative example 5 | FIG. 5(A) | 0.17/620k | 2.8 | 197 (100%) | 99 | 6.1–7.0 | 875 | 70–73 |
| Present invention 5 | FIG. 2 | 0.20/465k | 0 | 182 (96%) | 100 | 3.7–4.1 | 900 | 57–59 |
| Comparative example 6 | FIG. 6(A) | 0.20/465k | 3.7 | 190 (100%) | 98 | 0.8–0.9 | 900 | 61–63 |

As shown in the Table 1, if the specimens according to the present invention are compared with those of the comparative examples having the same cell structure as those of the present invention, it is understood that the specimens according to the present invention in which the incomplete cells are sealed can show an excellent thermal shock resistivity and an excellent endurable pressure strength, and can reduce a using amount of the expensive precious metal by about 5% which is realized from the result of the catalyst carrying weight. Moreover, in the comparative example 7, the effective area rate which contributes to a trapping performance is minimum. Further, the specimens according to the present invention other than the present inventions 2 and 6 can be produced by extrusion and thus they are economically effective.

The present invention is not limited to the embodiments mentioned above, but various deformations can be possible. For example, in the embodiments mentioned above, the cross section in a radial direction of the honeycomb structural body is circular, but it is possible to use the honeycomb

What is claimed is:

1. A ceramic honeycomb structural body comprising an outer peripheral wall, partition walls forming complete cells extending along a central portion of the body and incomplete cells extending along an outer periphery of the body, said incomplete cells being partially defined by said outer peripheral wall, wherein fewer than all of said incomplete cells are sealed by ceramic materials.

2. The ceramic honeycomb structural body according to claim 1, wherein said incomplete cells have an area not more than 90% of an area of the complete cells.

3. The ceramic honeycomb structural body according to claim 1, wherein said ceramic materials used for sealing said incomplete cells are the same as those of the ceramic honeycomb structural body.

4. The ceramic honeycomb structural body according to claim 1, wherein said ceramic honeycomb structural body is comprised of cordierite.

5. The ceramic honeycomb structural body according to claim 1, wherein said ceramic materials used for sealing said incomplete cells include a cement having a heat resistivity or a catalyst mainly comprised of an active alumina.

6. The ceramic honeycomb structural body according to claim 1, wherein said incomplete cells are formed integrally by extruding.

7. The ceramic honeycomb structural body according to claim 1, wherein said incomplete cells are sealed after sintering.

* * * * *